United States Patent
Pinto et al.

(10) Patent No.: US 11,718,271 B2
(45) Date of Patent: Aug. 8, 2023

(54) SYSTEM AND METHOD TO DEFROST A WINDSHIELD

(71) Applicant: GM GLOBAL TECHNOLOGY OPERATIONS LLC, Detroit, MI (US)

(72) Inventors: Nicholas W. Pinto, Shelby Township, MI (US); Kuo-huey Chen, Troy, MI (US); Todd J. Gordon, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 696 days.

(21) Appl. No.: 16/733,186

(22) Filed: Jan. 2, 2020

(65) Prior Publication Data

US 2021/0206351 A1 Jul. 8, 2021

(51) Int. Cl.
| | | |
|---|---|---|
| *B60S 1/02* | (2006.01) | |
| *H05B 3/20* | (2006.01) | |
| *H05B 1/02* | (2006.01) | |
| *B60S 1/54* | (2006.01) | |
| *B60S 1/58* | (2006.01) | |
| *B60S 1/60* | (2006.01) | |
| *H05B 3/84* | (2006.01) | |

(52) U.S. Cl.
CPC ............ *B60S 1/026* (2013.01); *B60S 1/54* (2013.01); *B60S 1/58* (2013.01); *B60S 1/603* (2013.01); *H05B 1/0236* (2013.01); *H05B 3/20* (2013.01); *H05B 3/84* (2013.01); *H05B 2203/031* (2013.01)

(58) Field of Classification Search
CPC .... B60S 1/026; B60S 1/54; B60S 1/58; B60S 1/603; B60S 1/64; B60S 1/048; H05B 1/0236; H05B 3/20; H05B 3/84; H05B 3/845; H05B 2203/031; H05B 2203/037
See application file for complete search history.

(56) References Cited

U.S. PATENT DOCUMENTS

| | | | | |
|---|---|---|---|---|
| 6,963,049 B1* | 11/2005 | Martin | ..................... | B60S 1/54 219/202 |
| 9,321,364 B1* | 4/2016 | Ashworth | ................ | H05B 3/28 |
| 2003/0047549 A1 | 3/2003 | Horey et al. | | |
| 2005/0040151 A1* | 2/2005 | Dyrdek | .................... | H05B 3/84 219/203 |

(Continued)

FOREIGN PATENT DOCUMENTS

| | | | | | |
|---|---|---|---|---|---|
| WO | WO-2005020637 A1 | * | 3/2005 | .............. | H05B 3/84 |
| WO | WO-2009040057 A1 | * | 4/2009 | .............. | H05B 3/84 |

OTHER PUBLICATIONS

Laukkoen, Jeremy, "How Do Car Defrosters Work?", Retrieved from the Internet <https://www.lifewire.com/how-do-car-defrosters-work-534663>, 10pages, Jul. 2, 2019.

*Primary Examiner* — Shawntina T Fuqua

(57) ABSTRACT

One general aspect includes a system having one or more heat pads installed at a vehicle, the one or more heat pads configured to provide infrared energy transmissions to a vehicle component to defrost, defog, or both defrost and defog a surface of the vehicle component. The system may also carry out the following steps: (a) determining that ice or fog or both ice and fog has accumulated on the surface of the vehicle component; and (b) based on the determination made in step (a), activating the one or more heat pads to defrost, defog, or both defrost and defog a surface of the vehicle component.

14 Claims, 5 Drawing Sheets

(56) References Cited

U.S. PATENT DOCUMENTS

2012/0122636 A1   5/2012  Shurtleff
2016/0286608 A1*  9/2016  Maughan ................ H05B 3/36
2021/0023914 A1*  1/2021  Warey ..................... H05B 3/84
2021/0094512 A1*  4/2021  Kovach .................. B60R 11/04

\* cited by examiner

SYSTEM AND METHOD TO DEFROST A WINDSHIELD

INTRODUCTION

As shown in FIG. 1, during winter months in cold climates, a layer of ice can form over a vehicle's windshield and make it impossible for the vehicle's operator and/or passengers to see through the glass. Thus, the layer of ice, and any residual fog, will have to be melted and sufficiently removed before the vehicle can again be legally operated. One solution to this issue can be seen in FIG. 2, in which an HVAC defrosting vent, installed at the instrument panel, blows heated air on the undersurface of the windshield. The hot air will generally heat the windshield and melt the ice over it, but this solution can be inefficient and ineffective. The air can only reach the locations on the windshield that are directly over the HVAC vent outlet and heat energy is lost rapidly once the air leaves the HVAC vent and while it travels along the windshield's underside. As a result, it can take approximately 10 minutes to melt enough ice on the windshield for the vehicle to become operable again. It can take far longer for chunks of ice that have formed around the windshield wiper blades to melt, if this is at all possible. This solution also causes the vehicle's engine to work harder and thus use more gasoline than desirable as well as overworks the HVAC system and can thus cause it to break down faster. Not to mention, an overworked HVAC system can be loud and thus irritating for anyone within the vehicle's interior. It is therefore desirable to provide a system and method that reduces the amount of energy and noise of a traditional defrost (deice) and defog system. This system and method can effectively decrease the amount of time needed for deicing and defogging the windshield, melt ice that has formed around the vehicle's windshield wiper blades or voids in heated glass, reduce the noise produced by the HVAC system. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: one or more heat pads installed at a vehicle, the one or more heat pads configured to provide infrared energy transmissions to a vehicle component to defrost, defog, or both defrost and defog a surface of the vehicle component. Other embodiments of this aspect include corresponding computer systems, apparatus, and computer programs recorded on one or more computer storage devices, each configured to perform the actions of the methods.

Implementations may include one or more of the following features. The system where the one or more heat pads are activated and deactivated via a manual control installed at the vehicle. The system further including: a memory configured to include one or more executable instructions and a processor configured to execute the executable instructions, where the executable instructions enable the processor to carry out the following steps: (a) determining that ice or fog or both ice and fog has accumulated on the surface of the vehicle component; and (b) based on the determination made in step (a), activating the one or more heat pads to defrost, defog, or both defrost and defog a surface of the vehicle component. The system further including: a primary defroster installed at the vehicle; and where the executable instructions enable the processor to carry out the following additional steps: (c) based on the determination made in step (a), activating the primary defroster in conjunction with the one or more heat pads to defrost, defog, or both defrost and defog a surface of the vehicle component. The system further including: a secondary defroster installed at the vehicle; and where the executable instructions enable the processor to carry out the following additional steps: (c) based on the determination made in step (a), activating the secondary defroster in conjunction with the one or more heat pads to defrost, defog, or both defrost and defog a surface of the vehicle component. The system where the executable instructions enable the processor to carry out the following additional steps: (c) determining that a substantial amount of ice or fog or both ice and fog has been removed from the surface of the vehicle component; and (d) based on the determination made in step (c), deactivating the one or more heat pads. The system where the one or more heat pads is installed at an instrument panel, rearview mirror, A-pillar, or some combination thereof. The system where the vehicle component is a windshield. Implementations of the described techniques may include hardware, a method or process, or computer software on a computer-accessible medium.

One general aspect includes a method including: (a) activating one or more heat pads installed at a vehicle to provide infrared energy transmissions to a vehicle component so as to defrost, defog, or both defrost and defog a surface of the vehicle component. Other embodiments of this aspect include corresponding computer systems, apparatus, and computer programs recorded on one or more computer storage devices, each configured to perform the actions of the methods.

Implementations may include one or more of the following features. The method where the one or more heat pads are activated and deactivated via a manual control installed at the vehicle. The method further including: (b) determining, via a processor, that ice or fog or both ice and fog has accumulated on the surface of the vehicle component; and (c) based on the determination made in step (b), via the processor, activating the one or more heat pads to defrost, defog, or both defrost and defog a surface of the vehicle component. The method further including: (d) providing a primary defroster installed at the vehicle; and (e) based on the determination made in step (b), via the processor, activating the primary defroster in conjunction with the one or more heat pads to defrost, defog, or both defrost and defog a surface of the vehicle component. The method further including: (d) providing a secondary defroster installed at the vehicle; and (e) based on the determination made in step (b), via the processor, activating the secondary defroster in conjunction with the one or more heat pads to defrost, defog, or both defrost and defog a surface of the vehicle component. The method further including: (b) determining, via the processor, a substantial amount of ice or fog or both ice and fog has been removed from the surface of the vehicle component; and (c) based on the determination made in step (b), via the processor, deactivating the one or more heat pads. The method where the one or more heat pads is installed at an instrument panel, rearview mirror, A-pillar, or some combination thereof. The method where the vehicle component is a windshield. Implementations of the described techniques may include hardware, a method or process, or computer software on a computer-accessible medium.

One general aspect includes a non-transitory and machine-readable medium having stored thereon executable instructions adapted to defrost, defog, or both defrost and defog a surface of a vehicle component, which when provided to a processor and executed thereby, causes the processor to carry out the following steps: (a) activating one or more heat pads installed at a vehicle to provide infrared energy transmissions to the vehicle component so as to defrost, defog, or both defrost and defog the surface of the vehicle component. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further includes: (b) determining that ice or fog or both ice and fog has accumulated on the surface of the vehicle component; and (c) based on the determination made in step (b), activating the one or more heat pads to defrost, defog, or both defrost and defog a surface of the vehicle component. The non-transitory and machine-readable memory further including: (d) determining a substantial amount of ice or fog or both ice and fog has been removed from the surface of the vehicle component; and (e) based on the determination made in step (d), deactivating the one or more heat pads. The non-transitory and machine-readable memory where the one or more heat pads is installed at an instrument panel, rearview mirror, A-pillar, or some combination thereof. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiment(s). As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
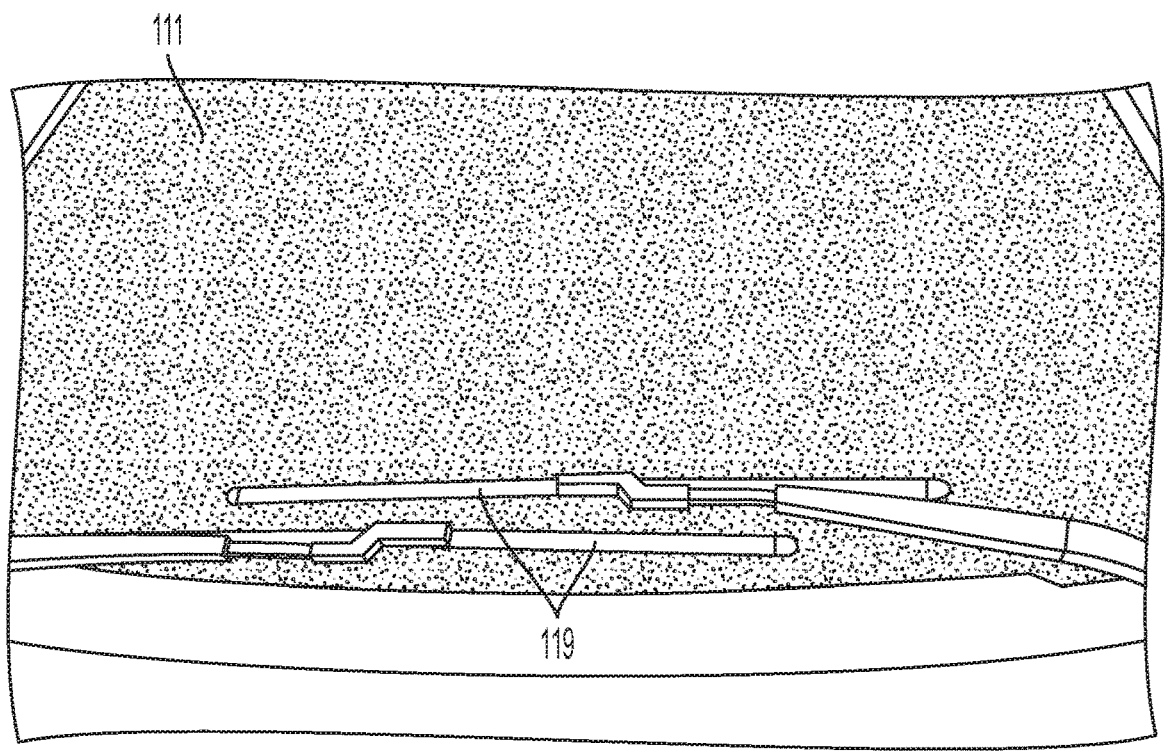
FIG. 1 shows an exemplary vehicle having a layer of ice formed over its windshield.
Figure 2:
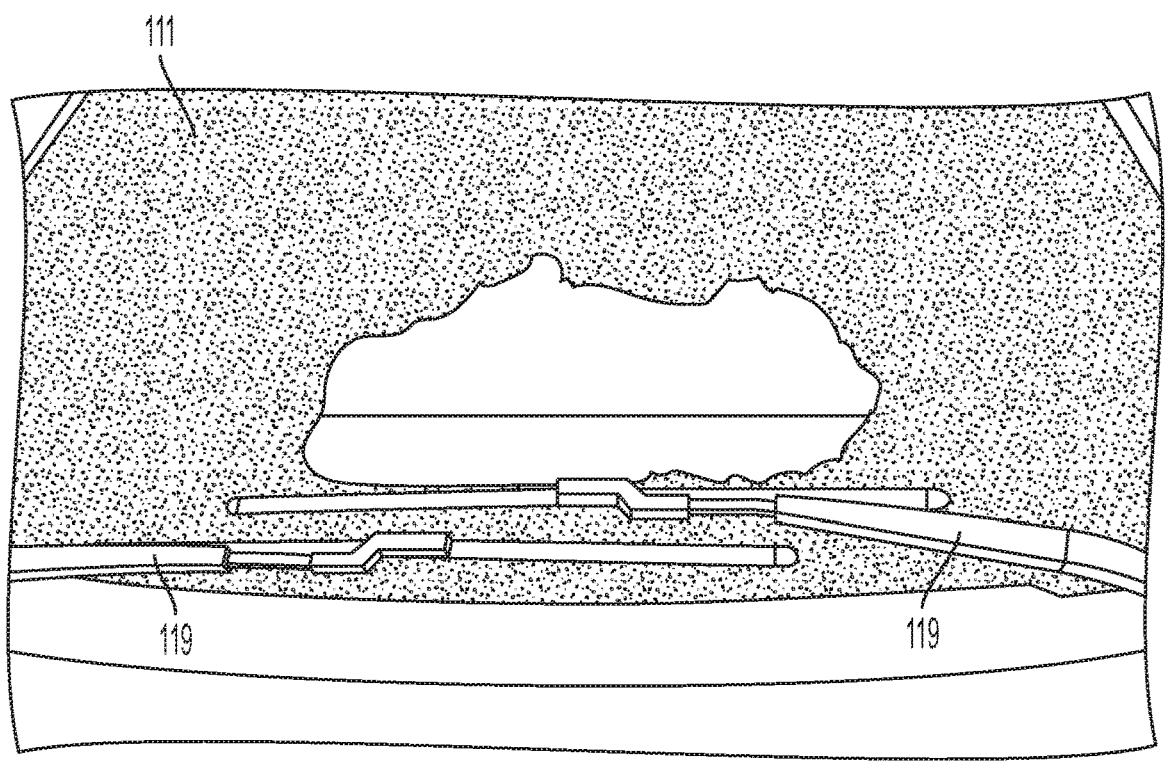
FIG. 2 shows the exemplary vehicle of FIG. 1 implementing an exemplary prior art system and method to melt the layer of ice formed over the windshield.
Figure 3:
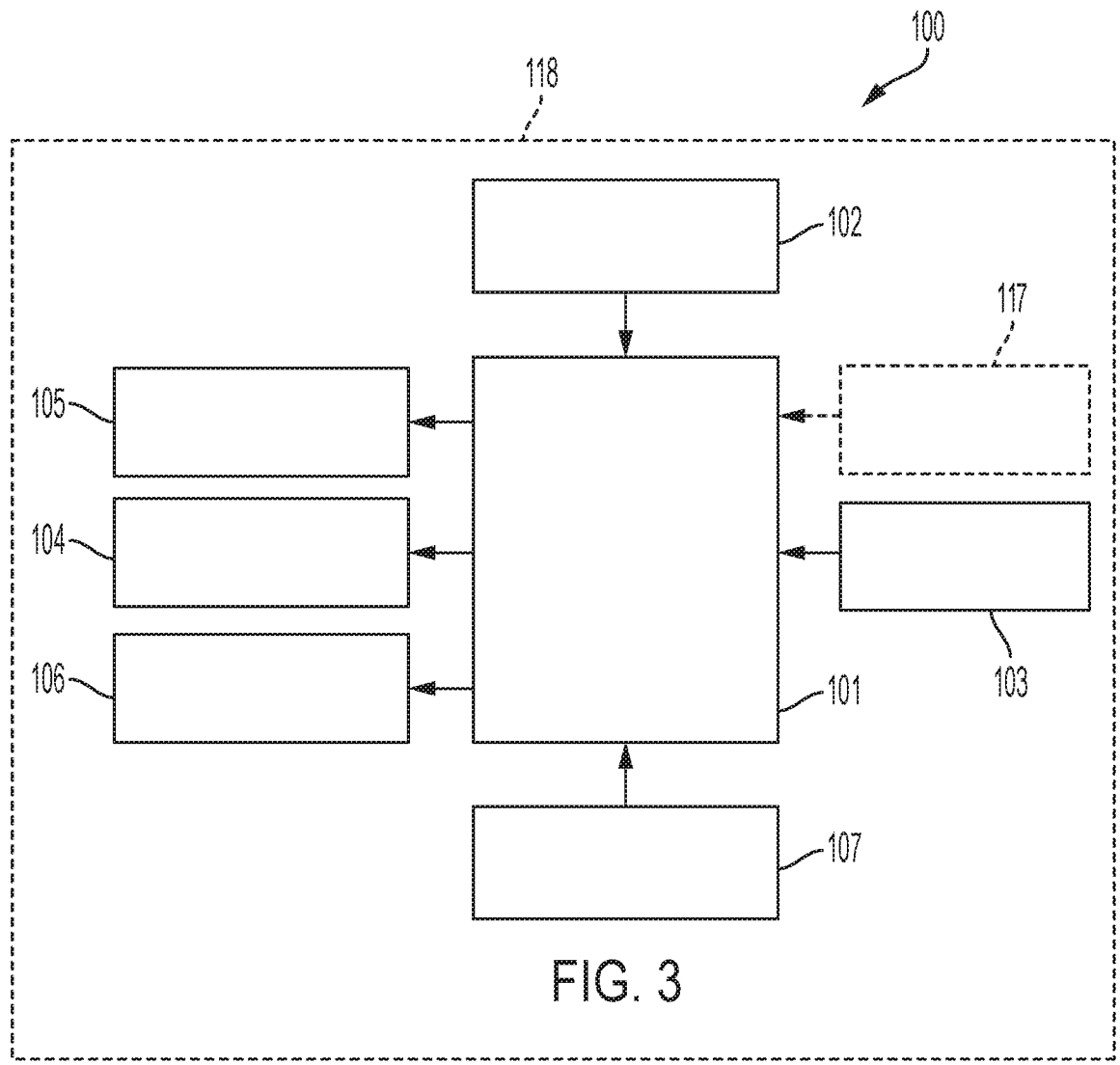
FIG. 3 shows an exemplary block diagram of an exemplary embodiment of a system to heat a windshield.

Referring to the drawings in detail, and specifically to FIG. 3, a block diagram of an exemplary system to heat a vehicle windshield for the purpose of defrosting and/or defogging the windshield is generally indicated by reference numeral 100. As shown, the disclosed system 100 includes a controller 101, a power supply 102, a memory 103, and one or more heating pads 104, a primary defroster 105, a secondary defroster 106, and one or more sensors 107. However, system 100 is not limited to the aforementioned configuration and may be configured to include additional elements and/or omit one or more of the aforementioned elements.

Controller 101 can be located in a vehicle telematics unit and controller 101 essentially controls the overall operation and function of system 100. Upon reading and executing one or more executable instructions, controller 101 may control, send, and/or receive information from one or more of memory 103, one or more heating pads 104, primary defroster 105, secondary defroster 106, the one or more sensors 107, and manual control 117, of system 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

Power supply 102 provides power to one or more of the controllers 101, memory 103, the one or more heating pads 104, primary defroster 105, secondary defroster 106, the one or more sensors 107, and the manual control 117. The power supply 102 may include one or more from a battery, an outlet, a capacitor, a solar energy cell, a generator, a wind energy device, an alternator, etc.

Memory 103 can be located in a vehicle telematics unit and is configured for recording information, storing information, and retrieving information used by system 100. Memory 103 may include the executable instructions configured to be read and executed by controller 101 so as to perform the functions of system 100. Memory 103 may also be controlled by controller 101 to record, store, and retrieve various types of data in databases.

Memory 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

Figure 4:
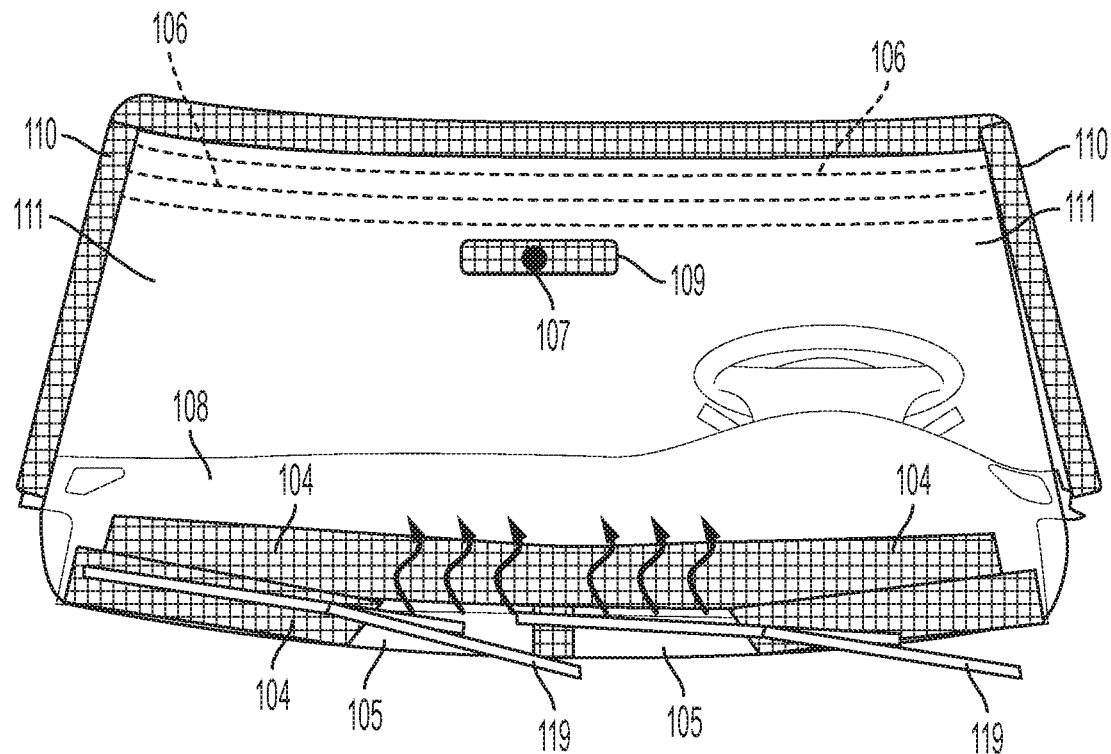
FIG. 4 shows one or more aspects of the exemplary system to heat a windshield being implemented in an exemplary vehicle environment.
Figure 5:
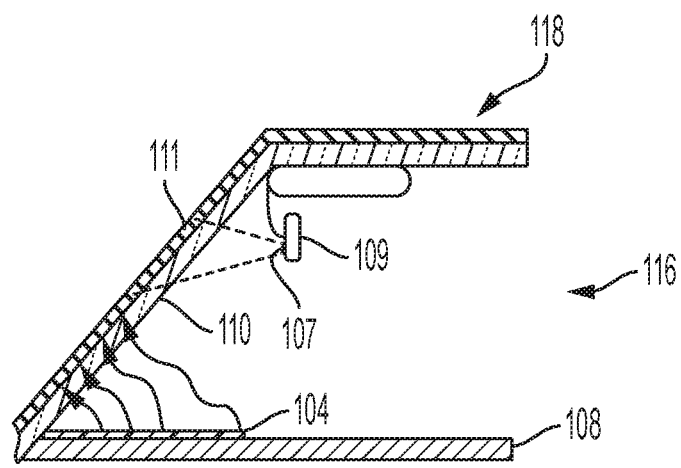
FIG. 5 shows one or more aspects of the exemplary system to heat a windshield being implemented in an exemplary vehicle environment.
Figure 6:
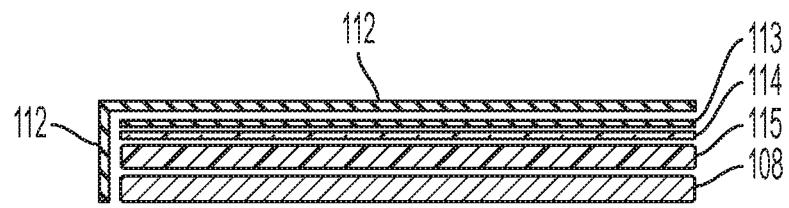
FIG. 6 shows one or more aspects of the exemplary system to heat a windshield being implemented in an exemplary vehicle environment.

As can be seen in FIGS. 4-6, each of the one or more heating pads 104 is a flexible pad that can be installed within the vehicle's interior cabin 106 (e.g., on the instrument panel, dashboard, or fascia 108, backside of rearview mirror 109) and/or within the vehicle's body (e.g., on the A-pillar 110) and these pads can provide a warming surface through the use of infrared energy transmissions (i.e., in the form of radiant electromagnetic waves) that radiate from the pad and onto a specific vehicle component (e.g., the windshield 111, rear window, or one or more side windows). With further reference to FIG. 5, the infrared energy transmissions can pass directly through specific vehicle component (e.g., the windshield 111, rear window, or one or more side windows) to heat the exterior surface of that component. With further reference to FIG. 6, each of the one or more heating pads 104 includes a top and bottom layer 112 of cloth material sandwiching a heating element 113 (e.g., carbon fiber or a coiled heating wire, and which can have a thickness of approximately 0.5 millimeters) on top of a reflecting layer 114 (e.g., reflective strips or coating made of: heat reflective fabric or tape, metallized plastic, metallized fabric, metal foil, or heat reflective paint, and which can have a thickness of 10 micrometers) and insulation layer 115 (e.g., an insulated silica gel, and which can have a thickness of approximately 1 millimeter). Skilled artists will see that the reflecting layer 114 and insulation layer 115 work in conjunction to ensure the infrared energy transmissions are projected away from the surface on which it has been installed (and thus ensure these transmissions effectively heat the specific vehicle component). Moreover, the one or more heating pads 104 can be installed at the vehicle (e.g., bonded within the vehicle's interior cabin or within the vehicle's body) via means such as, but not limited to, adhesives, rivets, screws, or nails. Skilled artists will also appreciate that the one or more heating pads 104 can be impregnated into the surface locations at which it is installed. For example, the one or more heating pads 104 can be impregnated into the body of the instrument panel 108, rearview mirror 109, or the side body of the A-pillar(s) 110. Skilled artists will further see that the configuration of the one or more heating pads 104 may vary based on, for example, the location at which they are installed within the vehicle's interior cabin 116 and/or within the vehicle's body, the specific vehicle component being heated by the one or more heating pads 104, and the direction in which infrared energy transmissions are to radiate from the one or more heating pads 104. Thus, the embodiments of the one or more heating pads 104 should not be limited to those disclosed in FIGS. 4-6.

The primary defroster 105 (otherwise known as a primary defogger) utilizes the vehicle's HVAC system and is located within the vehicle's interior cabin 116 (e.g., on the instrument panel, dashboard, or fascia 108). In order to melt ice or remove fog that has accumulated at the specific vehicle component, the primary defroster 105 causes the HVAC system to draw air in, pass the air through a heater element within the vehicle, and then use a blower to push the warm, dried air through a vent outlet and directly onto the specific vehicle component (e.g., bottom of windshield 111 or rear window). Skilled artists will see that primary defrosters 105 use convection heating to defrost and/or defog vehicle components and are well known in the art. Skilled artists will also see that, when used alone, the primary defroster can cause the exterior surface temperature of the windshield 111 (or rear window) to go from −10 degrees Celsius to 70 degrees Celsius in approximately 2400 seconds (i.e., approximately 40 minutes).

The secondary defroster 106 (otherwise known as a secondary defogger) can be a conduction heating device installed on or within one or more vehicle components (e.g., windshield 111 or rear window) and be a series or mesh of wires or conductive coating that use resistive heating to warm up a surface of the one or more vehicle components. As follows, when an electrical current is applied to the wires or conductive coating, resistance in the wires or coating causes heat generation. As such, when the wires heat up, or the coating heats up, they can melt ice and/or remove fog (or other kinds of condensation) that has accumulated on the surface of the one or more vehicle components. Therefore, the secondary defroster 106 uses radiant heating to melt ice and/or remove fog (or other kinds of condensation) that has accumulated on the surface of the one or more vehicle components. It should be understood that the wires or conductive coating can be embedded within the vehicle component or mounted on the component's surface.

The one or more sensors 107 can sense when (or help sense when) a condition exists that would require removal of ice or fog which has accumulated on a surface of the specific vehicle component (e.g., the exterior surface of the vehicle's windshield). For example, the one or more sensors 107 can include one or more digital cameras and each may be installed within the vehicle's interior cabin 116 (e.g., on the instrument panel 108 or backside of rearview mirror 109), as can be seen with further reference to FIG. 4. As such, each camera 107 may include the ability to record one or more digital images of at least the exterior surface of the vehicle's windshield 111 (i.e., by peering through and beyond the interior surface of the windshield). Moreover, object recognition software may be implemented to determine when enough ice or fog has accumulated on the exterior surface of windshield 111 to warrant defrosting or defogging or both defrosting and defogging the windshield 111 (and the wiper blades, if needed). Skilled artists will see that the object recognition software may be stored within at least one of the one or more cameras or the software may be stored in memory 103 (and executed by controller 101). In another example, the one or more sensors 107 can include a one or more humidity sensors configured to sense the humidity in the vehicle's interior as well as the environment outside of the vehicle. As such, these humidity sensors can be used to determine when the windshield has fogged up (e.g., when the humidity in the vehicle is substantially different than the humidity outside of the vehicle, or visa versa).

The one or more sensors 107 can also sense when (or help sense when) the condition requiring removal of ice or fog has ended (i.e., when the ice or fog has been substantially removed from the windshield or rear window). For example, the one or more sensors 107 can include a one or more humidity sensors configured to sense the humidity in the vehicle's interior as well as the environment outside of the vehicle. As such, these humidity sensors can be used to determine when the windshield has been fully defogged (e.g., when the temperature of the windshield glass or rear window glass has exceeded the dew point temperature) or at least defogged enough for the vehicle operator to see out of the windshield and properly operate the vehicle. In another example, the one or more sensors can include one or more thermometers configured to sense the temperature of the vehicle's windshield. As such, when the exterior surface of the vehicle's windshield reaches a certain temperature, it can be assumed that a sufficient amount of ice or fog has evaporated off the windshield (i.e., enough for at least the vehicle operator to see out of the windshield and operate the vehicle). In yet another example, the one or more sensors 107 can be one or more cameras implementing or collaborating with object recognition software configured to determine when a sufficient amount of ice or fog has evaporated off the windshield (i.e., enough for at least the vehicle operator to see out of the windshield and operate the vehicle).

The manual control 117 can be a physical or virtual button installed within the vehicle's interior (e.g., on the instrument panel, dashboard, or fascia 108, or on a GUI presented on an infotainment unit display). The manual control 117 can be configured to activate the one or more heating pads 104, primary defroster 105, and/or secondary defroster 106. As follows, a signal provided upon a vehicle passenger pressing the manual control 117 will be sent to controller 101 so as to cause controller 101 to activate the one or more heating pads 104, primary defroster 105, and/or secondary defroster 106.

According to an exemplary aspect, controller 101 is configured to activate the one or more heating pads 104 to provide infrared energy transmissions to the vehicle's windshield 111 (or rear window) to defrost, defog, or both defrost and defog the exterior surface of the windshield 111 (or rear window). For example, the one or more heating pads can be activated via a manual control installed at the vehicle or the one or more heat pads can be activated when controller 101 determines that ice or fog or both ice and fog has accumulated on the exterior surface of the windshield 111. Moreover, when the controller 101 determines that ice and/or fog has accumulated, the primary defroster 105 or secondary defroster 106, depending, can be activated in conjunction with the one or more heating pads 104. When the controller 101 also determines that a substantial amount of ice or fog or both ice and fog has been removed from the surface of the windshield, the controller 101 can deactivate the one or more heat pads.

Method

FIG. 3 shows an exemplary method 700 to heat a vehicle windshield for the purpose of sufficiently defrosting (i.e., deicing) and/or defogging the windshield such that a vehicle operator can properly view out of the windshield and properly operate their vehicle 118, according to an exemplary aspect. One or more aspects of windshield heating method 700 may be carried out by controller 101. For example, in order to carry out the one or more aspects of method 700, memory 103 includes executable instructions stored thereon and controller 101 executes these executable instructions. Skilled artists will see that one or more aspects of this method 700 can be carried out by the one or more heating pads 104, primary defroster 105, and secondary defroster 106.

Method 700 may begin at 701 in which the vehicle operator and/or one or more vehicle passengers enter into a vehicle 118. In step 710, the vehicle's engine is powered on or, in the case of an electric vehicle, the vehicle's battery is engaged. In step 720, the one or more sensors 107 sense a condition that requires removal of ice or fog that has built up on the exterior surface of the vehicle's windshield 111. Thus, it will be determined that enough ice or fog has built up on the exterior surface of the vehicle's windshield 111 to inhibit a vehicle operator from properly operating their vehicle 118. In step 730, it is determined whether system 100 is configured as an automatic climate control system or a manual climate control system. When system 100 is an automatic climate control system, method 700 will move to step 740a. However, when system 100 is a manual climate control system, method 700 will move to step 740b.

In step 740a, the automatic defrost/defog logic will be commenced. As follows, the one or more sensors 107 will monitor the approximate amount of ice/fog that has accumulated on the windshield 111 (or rear window), the temperature on the exterior and interior surfaces of the windshield 111 (or rear window), the humidity outside of the vehicle, and the humidity within the vehicle's interior. For example, these conditions will be monitored while the windshield 111 (or rear window) is sufficiently covered by ice and/or fog such that a vehicle operator cannot properly operate their vehicle 118. These conditions may also be continuously monitored throughout vehicle operation. Moreover, the values of these monitored conditions may, at least temporarily, be stored in memory 103.

Figure 8:
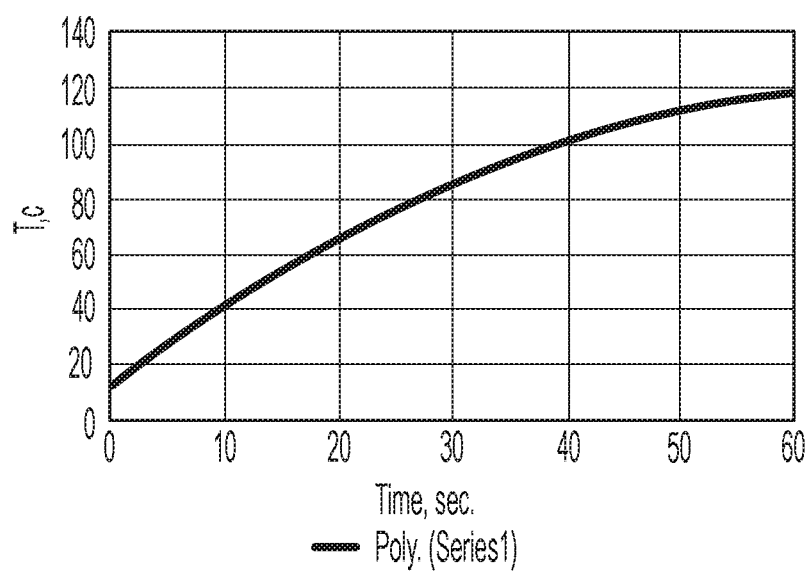
FIG. 8 shows one or more aspects of the exemplary method to heat a windshield being implemented in an exemplary vehicle environment.
Figure 7:
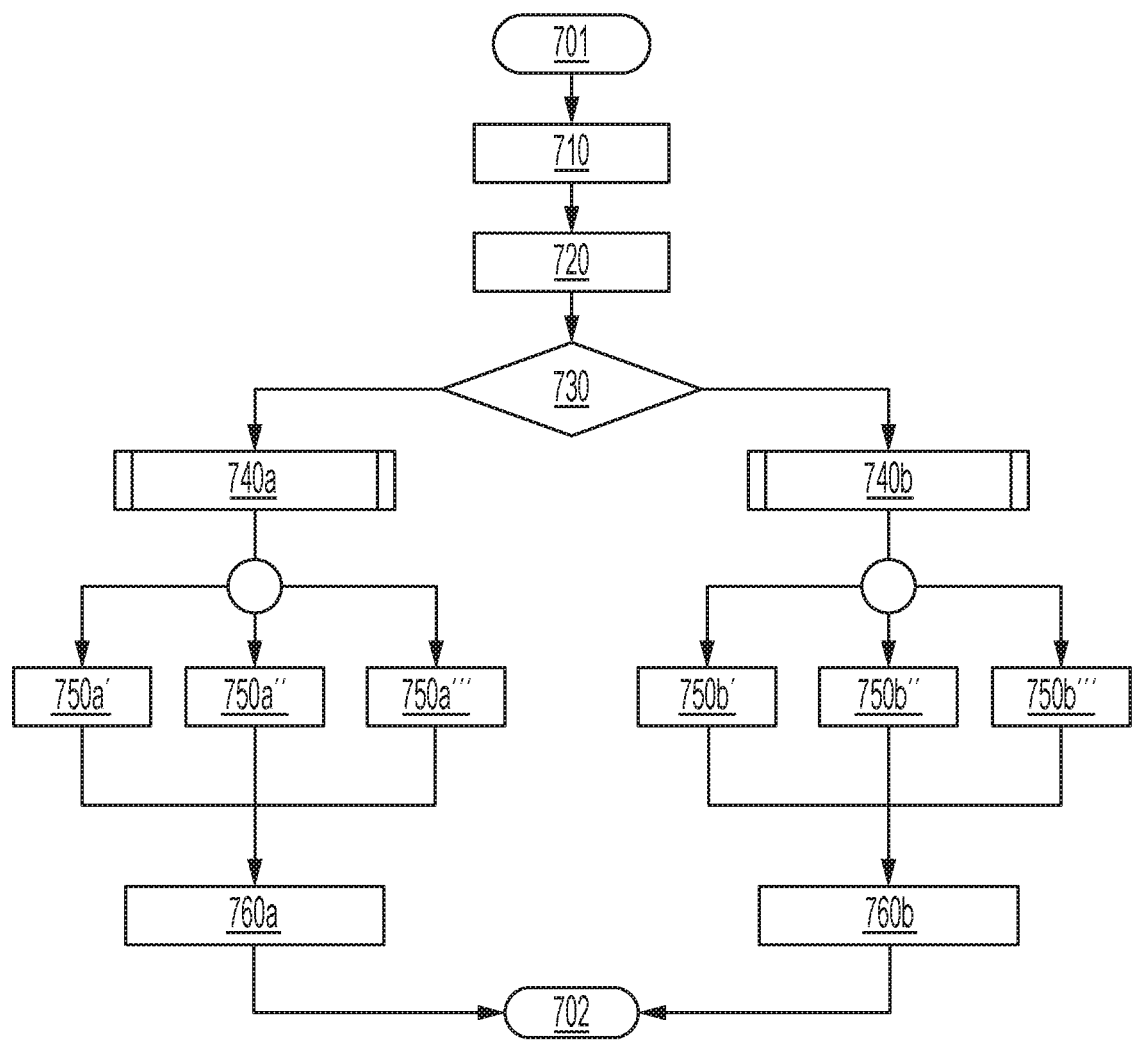
FIG. 7 shows one or more aspects of the exemplary system to heat a windshield being implemented in an exemplary vehicle environment.

The one or more heating pads 104 will also be activated in this step to heat the windshield (or rear window) and thus melt the ice and evaporate any water moisture that has accumulated on the windshield (or rear window). As an ice/fog temperature by time chart can be seen with additional reference to FIG. 8, when the one or more heating pads 104 are activated, ice and/or fog that has accumulated on the exterior surface of the windshield 111 (or rear window) can, for example, be heated to more than 100 degrees Celsius after approximately 40 seconds. Thus, the ice and/or fog may quickly evaporate off of the windshield 111 (or rear window). In addition, the one or more heating pads 104 will only use 12 volts of power to heat the windshield 111 (or rear window) in this manner. Skilled artists will see that heating the exterior surface of the windshield 111 (or rear window) to these temperatures can be an effective way to melt any additional ice that has accumulated onto the blades of one or both windshield wipers 119 associated with windshield 111 (or rear window). As such, removing ice particles around the windshield wipers 119 in this manner can help avoid damage to the wiper blades caused by ice/frozen particulates gouging the rubber. The one or more heating pads 104 can also be installed at the instrument panel 108, rearview mirror 109, A-pillar 110, or some combination thereof. In certain instances, when the system includes multiple heating pads 104, only certain heating pads 104 will be activated based on the locations of windshield 111 (or rear window) that have accumulated the most ice and/or fog.

In one or more embodiments, in step 750a', when system 100 includes a primary defroster 105 in addition to the one or more heating pads 104, the primary defroster 105 will be activated in conjunction with the one or more heating pads 104. As follows, the primary defroster 105 will blow heated air onto the interior surface of the windshield 111 (or rear window) in addition to the infrared energy transmissions from the one or more heating pads 104. The air being blown out of the primary defroster 105 may also be reduced so as to reduce the load noise of the blower of the primary defroster. As should be understood, activating both the one or more heating pads 104 and primary defroster 105 can cause the ice and/or fog to clear from the windshield 111 (or rear window) in a quicker manner than when the one or more heating pads 104 are used by themselves.

Alternatively, in step 750*a*", when system 100 includes a secondary defroster 106 in addition to the one or more heating pads 104, the secondary defroster 106 will be activated in conjunction with the one or more heating pads 104. As follows, the secondary defroster 106 will heat up the wires or conductive coating within windshield 111 (or rear window) in addition to the infrared energy transmissions from the one or more heating pads 104. As should be understood, activating both the one or more heating pads 104 and secondary defroster 106 can cause the ice and/or fog to clear from the windshield 111 (or rear window) in a quicker manner than when the one or more heating pads 104 are used by themselves.

Alternatively, in step 750*a*'", when system 100 includes both a primary defroster 105 and secondary defroster 106 in addition to the one or more heating pads 104, each of the primary defroster 105 and secondary defroster 106 will be activated in conjunction with the one or more heating pads 104. As follows, the primary defroster 105 will blow heated air onto the interior surface of the windshield 111 (or rear window) and the secondary defroster 106 will heat up the wires or conductive coating within windshield 111 (or rear window), both of which will be in addition to the infrared energy transmissions from the one or more heating pads 104. As should be understood, activating each the one or more heating pads 104, primary defroster 105, and secondary defroster 106 can cause the ice and/or fog to clear from the windshield 111 (or rear window) in a quicker manner than when the one or more heating pads 104 are used by themselves. In certain instances, the one or more heating pads 104 and secondary defroster 106 can be activated some time before the primary defroster 105 is activated. This will allow ice to first be melted quickly around the lower portion of the windshield 111 (or review window) for some amount of time before convection heating from primary defroster 105 is implemented to melt any/all ice around the rest of the windshield.

In step 760*a*, the automatic defrost/defog logic will be completed. As follows, based on the conditions that have been monitored by the one or more sensors 107, it has been determined that the ice and/or fog has been adequately removed from the windshield 111 (or rear window). Thus, the vehicle operator can look through the windshield 111 (or rear window) to properly operate their vehicle 118. After step 760*a*, method 700 moves to completion 702 (i.e., the one or more heating pads 104 and, when activated, the primary defroster 105 and/or secondary defroster 106 will be deactivated).

In step 740*b*, the manual defrost/defog logic will be commenced. As follows, the vehicle operator or one or more vehicle passengers will press the manual control 117 to activate the one or more heating pads 104, primary defroster 105, and/or secondary defroster 106 to heat the windshield (or rear window) and thus melt the ice and evaporate any water moisture or fog that has accumulated on the windshield (or rear window). A timing sequence can also be activated. The timing sequence will determine how long the one or more heating pads 104, primary defroster 105, and/or secondary defroster 106 will be activated to properly melt the ice and evaporate any water moisture/fog. The duration of the timing sequence can be based on information provided by the one or more sensors 107. For example, the duration of the timing sequence can be calibrated based on the temperature of the external side of the windshield 111 (or rear window). The one or more heating pads 104 will also be activated in this step to heat the windshield (or rear window) and thus melt the ice and evaporate any water moisture that has accumulated on the windshield (or rear window). The one or more heating pads 104 can also be installed at the instrument panel 108, rearview mirror 109, A-pillar 110, or some combination thereof. In certain instances, when the system includes multiple heating pads 104, only certain heating pads 104 will be activated based on the locations of windshield 111 (or rear window) that have accumulated the most ice and/or fog.

In one or more embodiments, in step 750*b*', when system 100 includes a primary defroster 105 in addition to the one or more heating pads 104, the primary defroster 105 will be activated in conjunction with the one or more heating pads 104. As follows, the primary defroster 105 will blow heated air onto the interior surface of the windshield 111 (or rear window) in addition to the infrared energy transmissions from the one or more heating pads 104. The air being blown out of the primary defroster 105 may also be reduced so as to reduce the load noise of the blower of the primary defroster. As should be understood, activating both the one or more heating pads 104 and primary defroster 105 can cause the ice and/or fog to clear from the windshield 111 (or rear window) in a quicker manner than when the one or more heating pads 104 are used by themselves.

Alternatively, in step 750*b*", when system 100 includes a secondary defroster 106 in addition to the one or more heating pads 104, the secondary defroster 106 will be activated in conjunction with the one or more heating pads 104. As follows, the secondary defroster 106 will heat up the wires or conductive coating within windshield 111 (or rear window) in addition to the infrared energy transmissions from the one or more heating pads 104. As should be understood, activating both the one or more heating pads 104 and secondary defroster 106 can cause the ice and/or fog to clear from the windshield 111 (or rear window) in a quicker manner than when the one or more heating pads 104 are used by themselves.

Alternatively, in step 750*b*'", when system 100 includes both a primary defroster 105 and secondary defroster 106 in addition to the one or more heating pads 104, each of the primary defroster 105 and secondary defroster 106 will be activated in conjunction with the one or more heating pads 104. As follows, the primary defroster 105 will blow heated air onto the interior surface of the windshield 111 (or rear window) and the secondary defroster 106 will heat up the wires or conductive coating within windshield 111 (or rear window), both of which will be in addition to the infrared energy transmissions from the one or more heating pads 104. As should be understood, activating each the one or more heating pads 104, primary defroster 105, and secondary defroster 106 can cause the ice and/or fog to clear from the windshield 111 (or rear window) in a quicker manner than when the one or more heating pads 104 are used by themselves. In certain instances, the one or more heating pads 104 and secondary defroster 106 can be activated some time before the primary defroster 105 is activated. This will allow ice to first be melted quickly around the lower portion of the windshield 111 (or review window) for some amount of time before convection heating from primary defroster 105 is implemented to melt any/all ice around the rest of the windshield.

In step 760*b*, the timing sequence will end. As follows, the ice and/or fog should be sufficiently removed from the windshield 111 (or rear window). Thus, the vehicle operator should be able to look through the windshield 111 (or rear window) to properly operate their vehicle 118. After step 760b, method 700 moves to completion 702 (i.e., the one or more heating pads 104 and, when activated, the primary defroster 105 and/or secondary defroster 106 will be deactivated).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system comprising:
one or more heat pads installed in a vehicle and impregnated as part of at least one of an A-pillar and a rearview mirror of the vehicle, the one or more heat pads configured to provide infrared energy transmissions to a vehicle component to defrost, defog, or both defrost and defog a surface of the vehicle component.

2. The system of claim 1, wherein the one or more heat pads are activated and deactivated via a manual control installed at the vehicle.

3. The system of claim 1, further comprising:
a memory configured to comprise one or more executable instructions and a processor configured to execute the executable instructions, wherein the executable instructions enable the processor to:
determine that ice or fog or both ice and fog has accumulated on the surface of the vehicle component; and
based on the determination that ice or fog or both ice and fog has accumulated on the surface, activating the one or more heat pads to defrost, defog, or both defrost and defog a surface of the vehicle component.

4. The system of claim 3, further comprising:
a primary defroster installed at the vehicle; and
wherein the executable instructions enable the processor to, based on the determination that ice or fog or both ice and fog has accumulated on the surface, activate the primary defroster in conjunction with the one or more heat pads to defrost, defog, or both defrost and defog a surface of the vehicle component.

5. The system of claim 3, further comprising a secondary defroster installed at the vehicle,
wherein the executable instructions enable the processor to, based on the determination that ice or fog or both ice and fog has accumulated on the surface, activate the secondary defroster in conjunction with the one or more heat pads to defrost, defog, or both defrost and defog a surface of the vehicle component.

6. The system of claim 3, wherein the executable instructions enable the processor to
determine that ice or fog or both ice and fog has been removed from the surface of the vehicle component; and
based on the determination that ice or fog or both ice and fog has been removed from the surface, deactivate the one or more heat pads.

7. The system of claim 1, wherein the vehicle component is a windshield.

8. A method comprising:
activating one or more heat pads installed at a vehicle to provide infrared energy transmissions to a vehicle component so as to defrost, defog, or both defrost and defog a surface of the vehicle component;
determining, via a processor, that ice or fog or both ice and fog has accumulated on the surface of the vehicle component;
providing at least one of a primary defroster and a secondary defroster installed at the vehicle; and
based on determining that ice or fog or both ice and fog has accumulated on the surface, via the processor, activating the at least one of the primary defroster and the secondary defroster in conjunction with the one or more heat pads to defrost, defog, or both defrost and defog a surface of the vehicle component.

9. The method of claim 8, wherein the one or more heat pads are activated and deactivated via a manual control installed at the vehicle.

10. The method of claim 8, further comprising:
providing the primary defroster installed at the vehicle; and
based on determining that ice or fog or both ice and fog has accumulated on the surface, via the processor, activating the primary defroster in conjunction with the one or more heat pads to defrost, defog, or both defrost and defog a surface of the vehicle component.

11. The method of claim 8, further comprising:
providing the secondary defroster installed at the vehicle; and
based on determining that ice or fog or both ice and fog has accumulated on the surface, via the processor, activating the secondary defroster in conjunction with the one or more heat pads to defrost, defog, or both defrost and defog a surface of the vehicle component.

12. The method of claim 8, further comprising:

determining, via the processor, that ice or fog or both ice and fog has been removed from the surface of the vehicle component; and based on determining that ice or fog or both ice and fog has been removed from the surface, via the processor, deactivating the one or more heat pads.

13. The method of claim 8, wherein the one or more heat pads is installed at an instrument panel, rearview mirror, A-pillar, or some combination thereof.

14. The method of claim 8, wherein the vehicle component is a windshield.

* * * * *